US007636326B2

(12) United States Patent
Geck et al.

(10) Patent No.: US 7,636,326 B2
(45) Date of Patent: Dec. 22, 2009

(54) PRIVATE COMMUNICATIONS NETWORK INCLUDING CONNECTED PUBLIC COMMUNICATIONS DEVICES AND METHOD OF OPERATION THEREOF

(75) Inventors: Bertram Geck, Boca Raton, FL (US); Francisco Olympio Marcon da Rocha, Boca Raton, FL (US); Robinson Osmar Lima, Boca Raton, FL (US); Luiz Cesar Zaniolo, Boca Raton, FL (US); Enoch Ragin, Jr., Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1263 days.

(21) Appl. No.: 10/032,889

(22) Filed: Dec. 26, 2001

(65) Prior Publication Data
US 2003/0118003 A1 Jun. 26, 2003

(51) Int. Cl.
*H04L 12/16* (2006.01)
*H04M 3/42* (2006.01)
(52) U.S. Cl. .............. 370/271; 370/352; 379/202.01
(58) Field of Classification Search ............ 370/260, 370/261, 271, 351, 352, 359, 353–356; 379/202.01, 379/204.01, 198, 201.01
See application file for complete search history.

(56) References Cited
U.S. PATENT DOCUMENTS

| 5,619,555 | A | * | 4/1997 | Fenton et al. | 379/88.11 |
| 5,812,653 | A |   | 9/1998 | Jodoin et al. | 379/205 |
| 5,995,608 | A |   | 11/1999 | Detampel, Jr. et al. | 379/205 |
| 6,020,915 | A | * | 2/2000 | Bruno et al. | 348/14.09 |
| 6,047,054 | A | * | 4/2000 | Bayless et al. | 379/202.01 |
| 6,181,786 | B1 |   | 1/2001 | Detampel, Jr. et al. | 379/205 |
| 6,262,979 | B1 |   | 7/2001 | Anderson et al. | 370/267 |
| 6,366,656 | B1 | * | 4/2002 | Lee et al. | 379/198 |
| 6,563,914 | B2 | * | 5/2003 | Sammon et al. | 379/202.01 |
| 2001/0026609 | A1 | * | 10/2001 | Weinstein et al. | 379/93.01 |
| 2002/0118671 | A1 | * | 8/2002 | Staples et al. | 370/352 |
| 2002/0176404 | A1 | * | 11/2002 | Girard | 370/352 |
| 2004/0210635 | A1 | * | 10/2004 | Raniere et al. | 709/204 |

OTHER PUBLICATIONS www.alexis.com/solutions/ (2000, 2001).

* cited by examiner

*Primary Examiner*—Aung S Moe
*Assistant Examiner*—Kerri M Rose

(57) ABSTRACT

A virtual private communications network (VPCN) and method of using the VPCN. The VPCN includes a communications server and at least one communications trunk connecting the communications server to a public telephone network. A web server and one or more digital telephones may be connected to the communications server. A remotely connected device (such as a PC or WAP) communicating with the communications server acts as a locally connected digital telephone. A remote telephone located in the vicinity of the remotely connected device provides telephonic communications in cooperation with the communications server controlled by the remotely connected device.

20 Claims, 4 Drawing Sheets

PRIVATE COMMUNICATIONS NETWORK INCLUDING CONNECTED PUBLIC COMMUNICATIONS DEVICES AND METHOD OF OPERATION THEREOF

BACKGROUND OF THE INVENTION

1. Field of the Invention

The present invention is related to a telephonic communications network and more particularly to a telephonic communications private network such as a Private Branch Exchange (PBX) Internet Protocol (IP) based network.

2. Background

State of the art communications servers such as a Private Branch Exchange (PBX) Internet Protocol (IP) based system have facilitated the convergence of voice and data communications, allowing businesses to bring voice and data systems together to form a seamless, efficient communications network. Typical communications servers, such as for example the Hicom 150H from Siemens Information and Communications Networks, Inc. (Siemens ICN), when supplemented with digital telephones, such as the Siemens family of Optiset® Digital Telephones, results in a full featured local telephone network.

In particular, users connected to such a full featured local telephone network can share both data and voice based information in applications across the existing network to improve productivity. State of the art local telephone networks are Local Area Network/Wide Area Network (LAN/WAN) based IP networks that are expanded easily, simply by adding extra IP telephones. Further, a user at a personal computer (PC) on the LAN/WAN can connect to the communications server and seamlessly communicate with other connected users. Thus, a private communications network that includes one of these state of the art communications servers provides user mobility and easy access for teleworking, as well as low cost voice over IP (VoIP) communications.

Normally, however, in order for the local telephone network users to have access to all of the communications server features, the users must have a high speed connection to the communications server, e.g., be connected to the LAN/WAN over a high speed broadband connection, such as a Digital Subscriber Line (DSL) or a cable modem line. These users with such a high speed connection can run a proprietary client application on a remote PC to communicate using VoIP.

Unfortunately, broadband is far from being universally available. Typically, the only available access to the communications server is by modem over a public switching telephone network (PSTN) or over a wireless device, e.g., a cell phone. Currently, neither hardware nor software is available in the prior art that makes all features of the communications server available to every user, including those users without a broadband connection. So, normally remote users cannot access all the features of the communications server.

Thus, there is a need to provide full access to all communications server features to remotely located users with a typical analog, land line or wireless connection.

SUMMARY OF THE INVENTION

It is a purpose of the invention to make PBX features available to remotely located users.

The present invention is a virtual private communications network (VPCN) and method of using the VPCN. The VPCN includes a communications server and at least one communications trunk connecting the communications server to a public telephone network. A web server and one or more digital telephones may be connected to the communications server. A remotely connected device (such as a PC or WAP) communicating with the communications server acts as a locally connected digital telephone. A remote telephone located in the vicinity of the remotely connected device provides telephonic communications in cooperation with the communications server controlled by the remotely connected device.

DESCRIPTION OF THE PREFERRED EMBODIMENT OF THE PRESENT INVENTION

Figure 1:
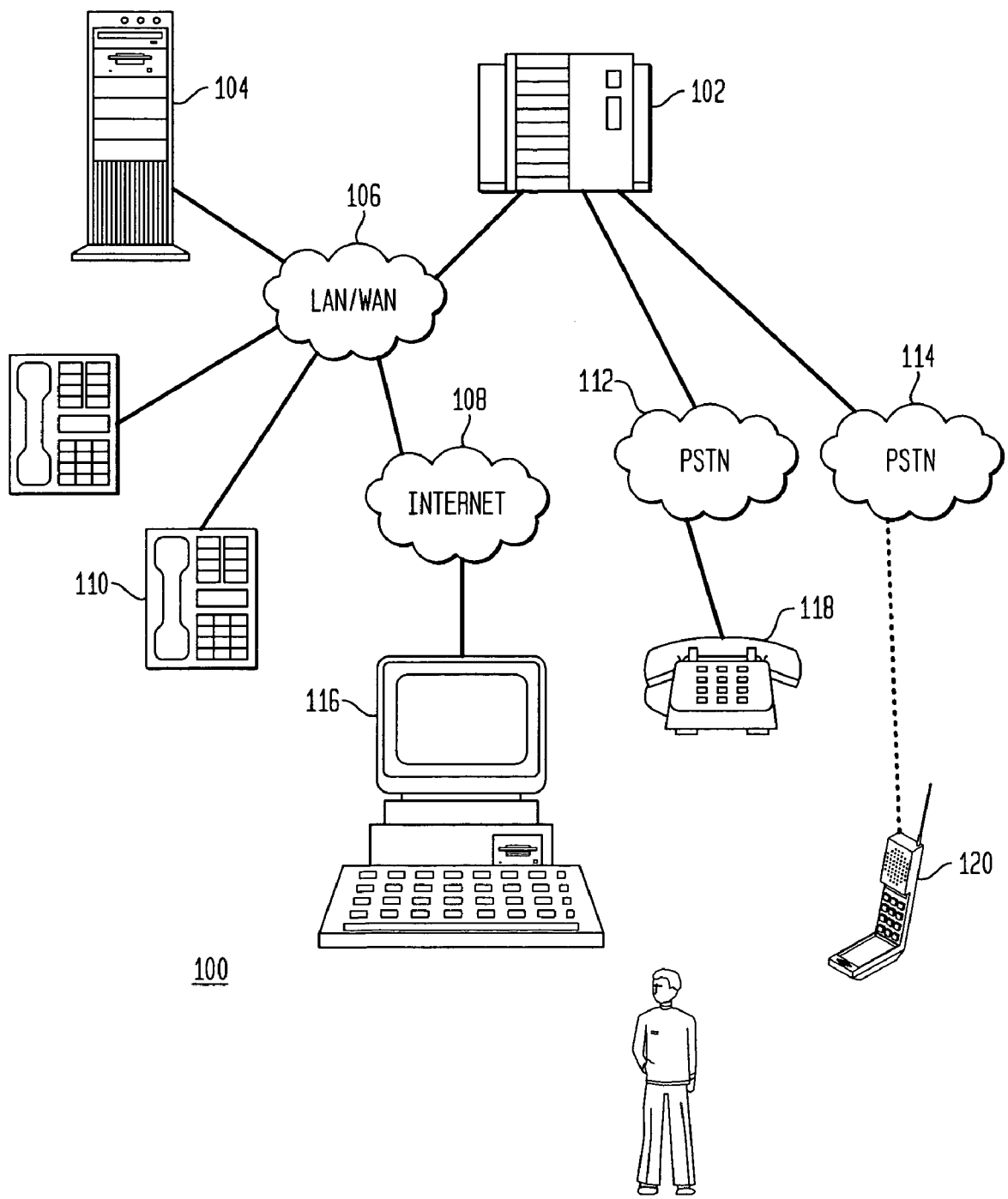
FIG. 1 shows a preferred embodiment communications network or system such as a Public Branch Exchange (PBX) Internet Protocol (IP) based communications network or system.

FIG. 1 shows a preferred embodiment communications network or system 100 such as a Public Branch Exchange (PBX) Internet Protocol (IP) based communications network or system. Communications server 102 is connected to a web server 104 over a local area network (LAN) 106. Further, the communications server 102 is connected through the LAN 106 to the Internet 108 and one or more digital phones 110. One or more trunks connect the communications server 102 to a public switching telephone network (PSTN) 112, 114. A remote user (e.g., at home or in a hotel room) at a remote web enabled device such as personal computer (PC) 116, may connect to the communications server 102 over the Internet 108. Any remote users with at least a low speed (low data rate) connection to the Internet 108 may use Telephony Application Program Interface (TAPI) on a personal computer 116 in combination with any telephonic device in the same vicinity to have access to all communications server features. Suitable low speed connection devices include, for example, an analog or land line telephone 118 connected to a PSTN 112, a personal digital assistant (PDA) (not shown) or the like with a wireless internet connection, or a wireless access protocol (WAP) device, such as a cell phone 120 connected to a WAP/cellular network connected to PSTN 114. These low speed connection devices may also be suitable telephonic device connections.

Figure 2A:
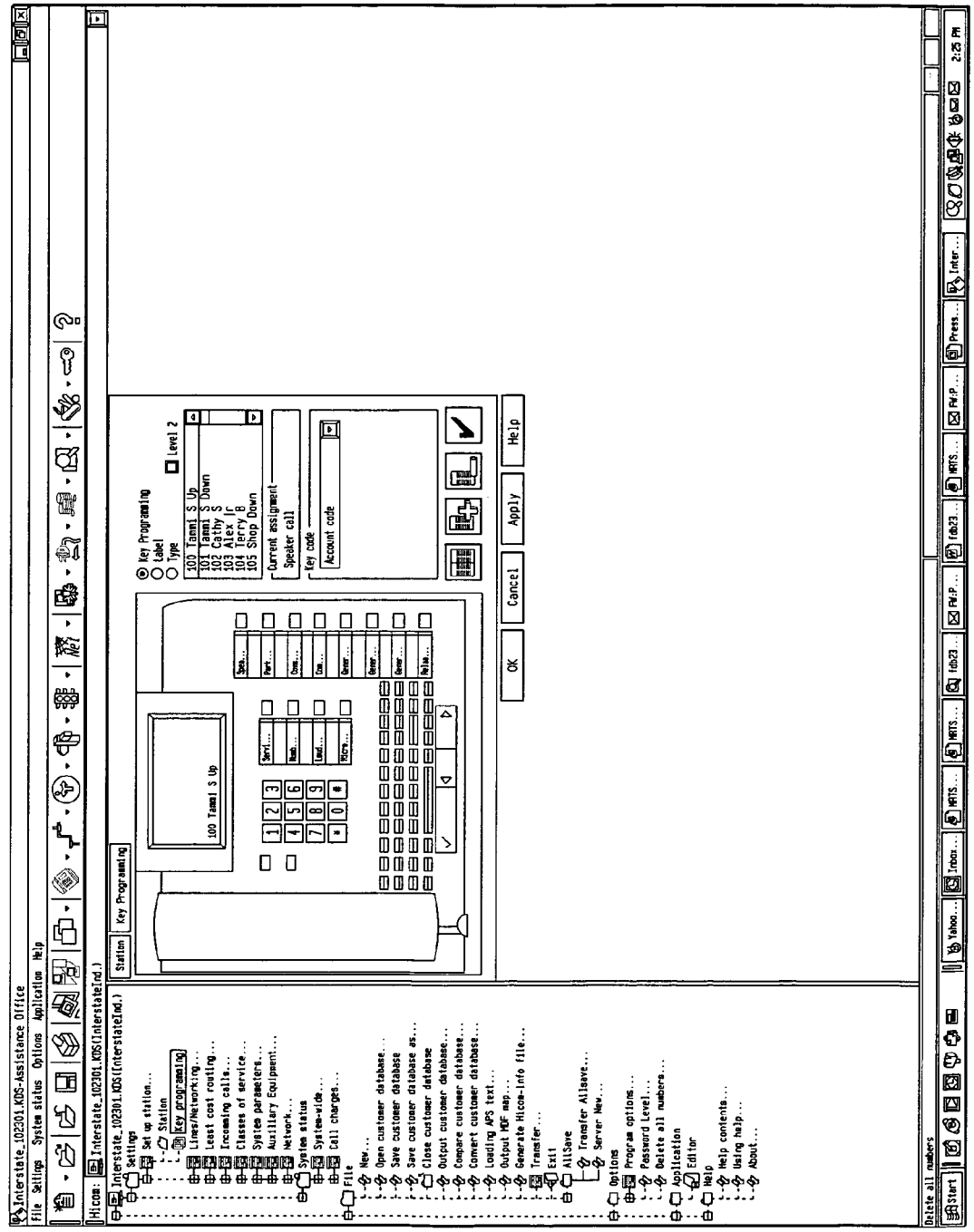
FIGS. 2A-B show an example of a TAPI graphical user interface (GUI) and a call management screen.
Figure 2B:
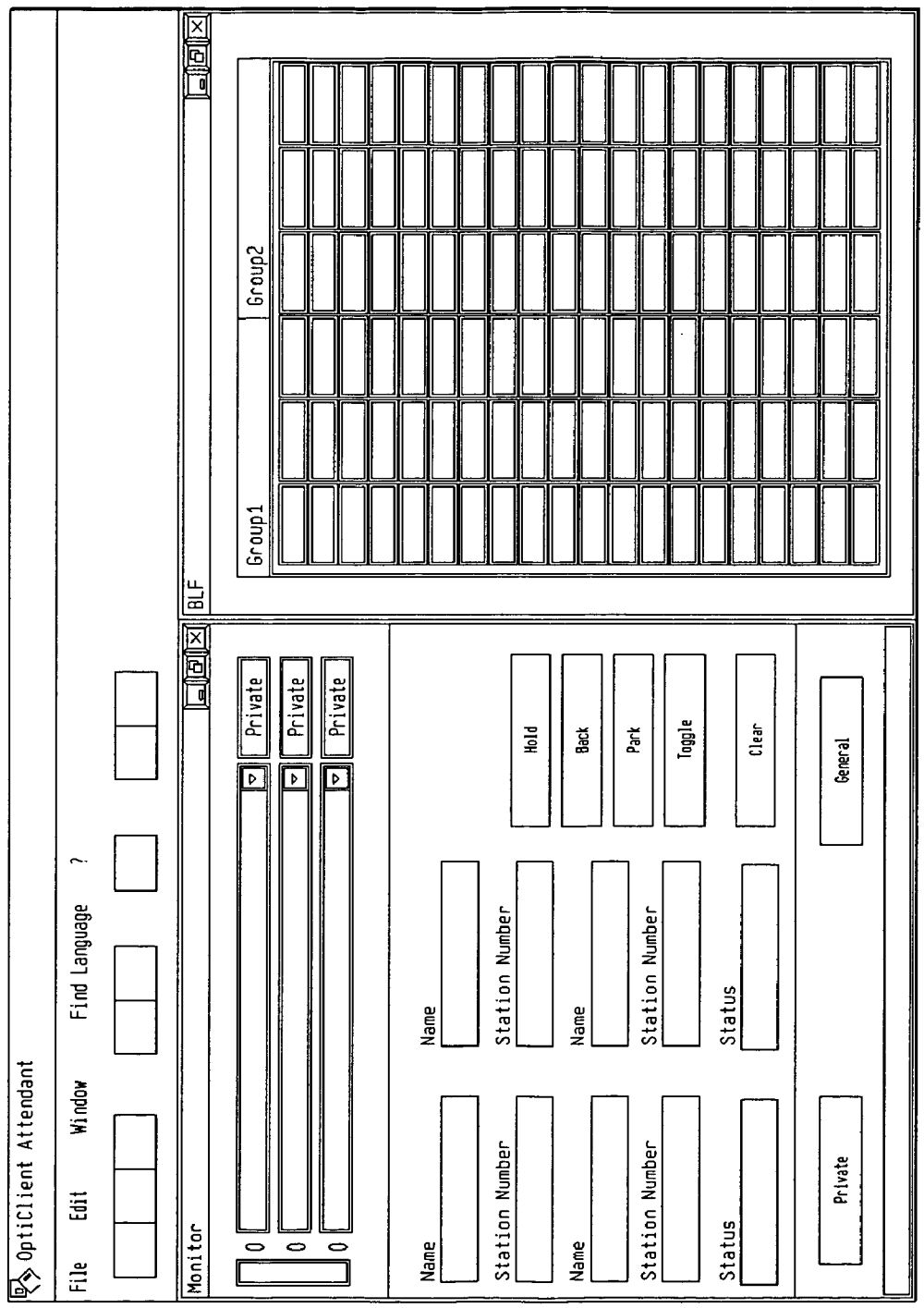

According to a preferred embodiment of the present invention, remote users connect over the Internet using the TAPI to interface with the communications server. FIG. 2A shows an example of a graphical user interface (GUI) for the Hicom 150H communications server from Siemens ICN which may be used to control normal voice communications over voice communications devices (118, 120 in FIG. 1). A typical stand alone computer client interface, such as for example, OPTICLIENT version 2.0 from Siemens ICN, provides access to most communications server features. FIG. 2B is an example of a call management screen. In this example, the OPTICLIENT emulates the OPTISET digital phone, also from Siemens ICN, on the user's PC. Once connected and logged in, the client application is treated as any other locally connected (i.e., connected directly to the LAN) digital phone. Simultaneously, the remote user communicates telephonically with another device connected to the PSTN, e.g., a land line phone 116 or cell phone 120. The resulting hybrid connection that includes the TAPI internet connection in combination with a low data rate device, appears to the rest of the system as just another locally connected digital telephone. Thus, all PBX system features are available to the user using this hybrid connection.

The hybrid connection of the TAPI interacting with the communications server 102 of FIG. 1 in combination with a low speed voice connection, e.g., the land line telephone 118 or the cell phone 120, effectively, is a virtual digital telephone and the network 100 is a virtual private communications network. Using this virtual digital telephone, the connected remote user may direct communications through communications server 102 nearly identically to on-site and locally connected users. Thus, in a typical telecommuting application, a remote user may initiate an in-system conference call from the remote location. So, in this example, the telecommuter may place a call to an in-system digital phone through the communications server. Then, the party at that digital phone is connected to the user's cell phone 120 or land line telephone 118 for an apparently in-network call.

Figure 3A:
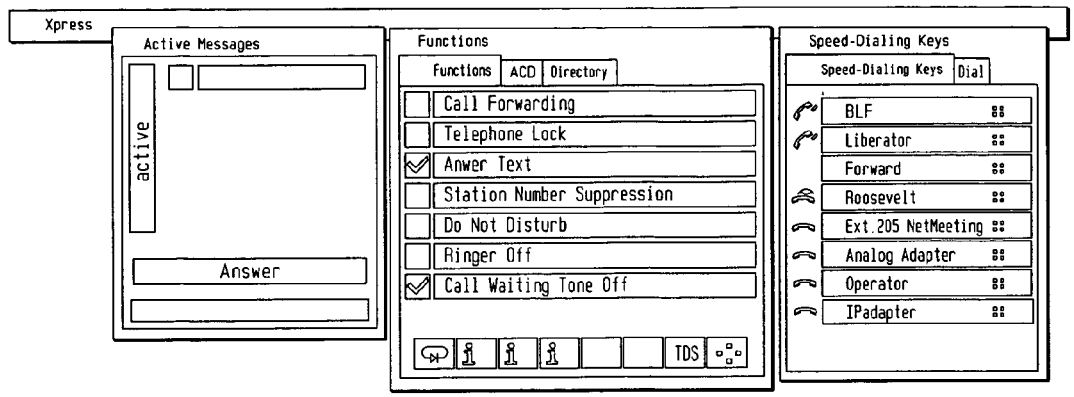
FIG. 3A shows an example of a drop down window for accessing communications server features.
Figure 3B:
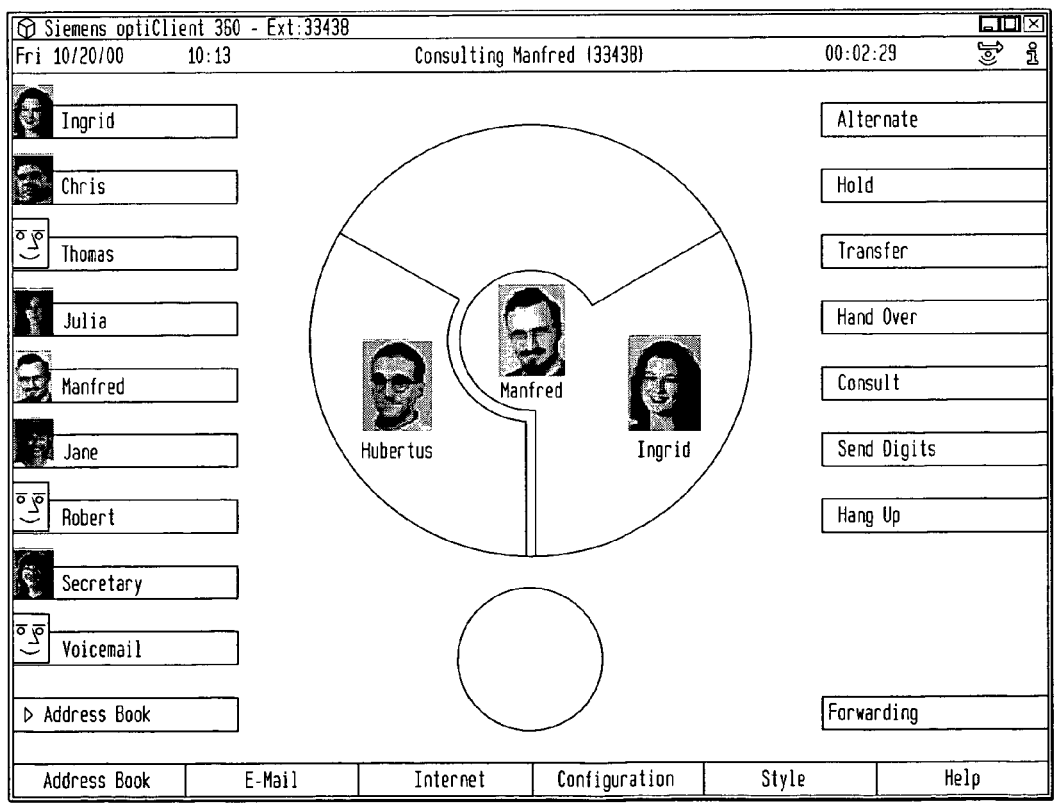
FIG. 3B shows an example of a local address book with entries identified by images for visual contact information.

Advantageously, regardless of location or connection type (modem, DSL, etc.), any remote user (telecommuter) with any IP connection and, simultaneously, some form of telephonic communications also available, has full access to the numerous robust capabilities and features of the communications server such as the drop down window examples of FIG. 3A. These features may include, for example, call connection processing to allow the user to make/accept calls or to terminate calls. Call status partner identification and call duration may be displayed at the TAPI. A visual indication of other incoming calls may be provided at the TAPI in a minimized window. A call hold/resume feature may allow the user to provide music-on-hold for incoming calls. Also, a consultation feature may be included to allow the user to toggle between alternate calls, e.g., call waiting, or to ping pong between several simultaneous calls. A (last) number redial may be included that lists several previously dialed numbers for redialing. Call forwarding may be provided to automatically forward calls without consultation or, if so desired, after consultation. Also, this call forwarding feature may be type selectable such that call forwarding type is fixed or, depends upon whether the called party answers after a selected number of rings or if the line is busy. Further, the TAPI may display call forwarding information for the user. Local speed dialing keys may be included and provided by the TAPI, to preprogram connections between the low data rate phones and other phones, including both local digital telephones and other non-system phones. As can be seen from the example of FIG. 3B, the TAPI may include a local address book with entries identified by images, providing visual contact information. These images and the address book may be stored locally, on the user's local PC, on the web server or, on another server.

In addition to the PBX type features, the TAPI provides the remote user with other system and user management functions that are normally available on such a system. These other features may include application sharing, work collaboration, project collaboration, typical e-mail functions as well as e-mail with integrated voice features. Typical e-mail functions are those such as may be provided by Microsoft Outlook or the Outlook™ Integration features provided in the Siemens OPTICLIENT 360.

Thus, referring again to FIG. 1 in a preferred embodiment hybrid connection, telephonic communications proceeds over a cell phone 120 or a land line telephone 118 through the communications server 102 between remote and local users, seamlessly. Intra system calls are placed from the hybrid connection just as if the remote users were connected directly to the system 100. Advantageously, voice communications are routed over any available conventional path and using conventional hardware and software and, since the minimal control data is passed over the Internet, there is no minimum performance or Quality of Service (QoS) requirement to maintain the communications link. An ordinary modem suffices, even a low performance modem, e.g., 33.6, 28.8 or even 14.4.

In another example, a first remotely connected party, e.g., a telecommuter can initiate a conference call to connect two internal or external parties (one connection being to the telecommuter's land line), while the remote initiating system (PC) remains outside of the conference call. The first party has full access to all communications server features over the hybrid connection. The web server handles internet protocol communications with remote users. Calls initiated by or, directed to the remote user are handled by the web server, which interfaces the remote user to the communications server.

So, as described above, the client may initiate a conference call between any two phones in the world that are accessible from a PSTN. For a three party conference call, the client PC can place a call to the user's cell phone, e.g., at 706-7766 in one area code. Then, the client PC can place the cell phone call on hold. Once the connection is made and, with the first call on hold, the client PC can place a second call to a land line phone, e.g., to 955-8003 in another distant area code. Thereafter, the client PC can go to consultation mode. In this example, both cellular and fixed, land line phones are connected over the communications server, while the client PC retains full control over the IP connection and has access to all server features. So, as the call progresses, the user may selectively forward conference call participants to another number, decide whether subsequent callers may join the conference call, are forwarded to another number, are connected to voice mail, etc.

In another preferred embodiment, instead of the web server, a WAP server provides internet access to WAP enabled devices such as web enabled cell phones, wireless enabled PDAs and the like. So, any Internet capable WAP device has the full feature range of the communications server available. The user controls calls using the Internet capable or web enabled cell phone functions, interfacing the cell phone's wireless Internet browser with the communications server. Again, the communications server, treats the hybrid connection of the combination of the web-based interface connection and telephone connection as any other digital telephone, making all communications server features accessible to the user from remote cell phone browser. Available communications server features are presented to the user over the browser interface, simultaneously with the call.

Accordingly, the present invention allows multiple parties to participate in conference calls through a communications server, whether the parties are local to the communications server or located at remote locations and connected through a low speed connection, e.g., a land line telephone or a cell phone. Such a hybrid conference call is made in cooperation with a web server or WAP server to provide remote users with full access to the communications server features, using standard land line phone or cell phone in cooperation with parallel access to the communications server for a virtual digital phone connection.

While the invention has been described in terms of preferred embodiments, those skilled in the art will recognize that the invention can be practiced with modification within the spirit and scope of the appended claims.

What is claimed is:

1. A virtual private communications network (VPCN) comprising:
   a communications server;
   a plurality of digital telephones connected to said communications server in a private telephone network;
   at least one communications trunk connecting said communications server to a public telephone network;
   a remotely connected device communicating with said communications server; and
   a remote telephone directly connected to said public telephone network and located in the vicinity of said remotely connected device, telephonic communications being provided to and from said remote telephone through said public telephone network in cooperation with said communications server and controlled by said remotely connected device, said remotely connected device and said remote telephone being a virtual digital telephone acting as a locally connected digital telephone in said private telephone network with access to digital telephone features, wherein said remotely connected device has access to all communications server features.

2. A VPCN as in claim 1 wherein said remotely connected device is a web enabled device connected over the Internet, said VPCN further comprising:
   a web server connected to said communications server and the Internet.

3. A VPCN as in claim 2 wherein said web enabled device is a personal computer (PC) and selects a corresponding remote telephone.

4. A VPCN as in claim 3 wherein said PC includes a modem connecting said PC to the Internet over a second public network, different than said public telephone network.

5. A VPCN as in claim 1 wherein said communications server is a PBX server providing said digital telephone features, said digital telephone features comprising:
   a call connection processing feature;
   a call status feature;
   a partner identification feature;
   a call duration feature;
   an incoming call indication feature;
   a call hold/resume feature;
   a consultation feature;
   a number redial feature;
   a call forwarding feature;
   speed dialing keys; and
   a local address book.

6. A VPCN as in claim 1 wherein said remote telephone is a wireless access protocol (WAP) device connected over the Internet.

7. A VPCN as in claim 6 wherein said WAP is a personal digital assistant (PDA) with a wireless connection to the Internet, separate from said remotely connected device.

8. A VPCN as in claim 1 wherein said remotely connected device is one of a plurality of remotely connected devices and said remote telephone is one of a plurality of remote telephones comprising an analog telephone connected to a land line to said public telephone network, a cell phone connected to a cellular network and a wireless access protocol (WAP) connected to a wireless network.

9. A virtual private communications network (VPCN) comprising:
   a PBX server;
   a web server connected to said PBX server and the Internet;
   a plurality of digital telephones connected to said PBX server in a private telephone network;
   at least one communications trunk connecting said PBX server to a public telephone network;
   a plurality of remotely connected web enabled devices communicating with said PBX server, said remotely connected devices each acting as a locally connected digital telephone in said private telephone network with access to digital telephone features; and
   a remote telephone directly connected to said public telephone network and located in the vicinity of each of said remotely connected web enabled devices, telephonic communications being provided to said digital telephones from remote telephones through said public telephone network in cooperation with said PBX server and simultaneously controlled by said remotely connected web enabled devices, wherein said remotely connected web enabled devices and corresponding said remote telephones act as a locally connected digital telephones in said private telephone network with access to all PBX features.

10. A VPCN as in claim 9 wherein at least one web enabled device is a personal computer (PC) and selects a corresponding remote telephone.

11. A VPCN as in claim 10 wherein at least one PC includes a modem connecting to the Internet, said at least one PC being connected to the web server over the Internet.

12. A VPCN as in claim 9 wherein at least one remote telephone is a wireless access protocol (WAP) device connected over the Internet, separate from said remotely connected web enabled devices.

13. A VPCN as in claim 12 wherein said WAP is a personal digital assistant (PDA) with a wireless connection to the Internet.

14. A VPCN as in claim 9, said PBX features comprising:
    a call connection processing feature;
    a call status feature;
    a partner identification feature;
    a call duration feature;
    an incoming call indication feature;
    a call hold/resume feature;
    a consultation feature;
    a number redial feature;
    a call forwarding feature;
    speed dialing keys; and
    a local address book.

15. A VPCN as in claim 9 wherein said remote telephones comprise an analog telephone connected to a land line to said public telephone network, a cell phone connected to a cellular network and a wireless access protocol (WAP) connected to a wireless network.

16. A method for communicating with a private communications network, said method comprising the steps of:
    a) connecting a remotely located web enabled device to a communications server in a private telephone network;
    b) providing said remotely located web enabled device with access to private network telephony features from said communications server; and
    c) initiating calls at the communications server from and to a remote telephone in the vicinity of said remotely located web enabled device, said calls being through a public telephone network directly connected to said remote telephone, said remotely located web enabled device initiating and controlling said calls, wherein providing said remotely located web enabled device with access provides said remotely located web enabled device with access to all communications server features.

17. A method as in claim 16 wherein the step (a) of connecting the remotely located web enabled device comprises the steps of:
  i) calling an Internet service provider;
  ii) negotiating a modem connection with said Internet service provider; and
  iii) connecting to a web server connected to said communications server, calls to said remote telephone being controlled by said web enabled device in real time.

18. A virtual private communications network (VPCN) comprising:
  a communications server in a private network;
  at least one communications trunk connecting said communications server to a public telephone network;
  a remotely connected device communicating with said communications server, said remotely connected device acting as a locally connected digital telephone in said private telephone network with access to digital telephone features; and
  a remote telephone directly connected to said public telephone network and located in the vicinity of said remotely connected device, telephonic communications being provided to and from said remote telephone through said public telephone network in cooperation with said communications server and controlled by said remotely connected device, wherein said remotely connected device and said remote telephone act together as a locally connected digital telephone in said private telephone network with access to all communications server features.

19. A VPCN as in claim 18, said communications server features comprising:
  a call connection processing feature;
  a call status feature;
  a partner identification feature;
  a call duration feature;
  an incoming call indication feature;
  a call hold/resume feature;
  a consultation feature;
  a number redial feature;
  a call forwarding feature;
  speed dialing keys; and
  a local address book.

20. A VPCN as in claim 18 wherein said remotely connected device is one of a plurality of remotely connected devices and said remote telephone is one of a plurality of remote telephones comprising an analog telephone connected to a land line to said public telephone network, a cell phone connected to a cellular network and a wireless access protocol (WAP) connected to a wireless network.

* * * * *